United States Patent
Roth et al.

(10) Patent No.: US 9,928,469 B1
(45) Date of Patent: Mar. 27, 2018

(54) TECHNIQUES FOR ADMINISTRATING FINITE LIFE INSTANCES

(71) Applicant: Amazon Technologies, Inc., Reno, NV (US)

(72) Inventors: Gregory B. Roth, Seattle, WA (US); Adam K. Loghry, Seattle, WA (US); David John Ward, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 13/633,748

(22) Filed: Oct. 2, 2012

(51) Int. Cl.
*G06Q 10/00* (2012.01)
*G06Q 40/06* (2012.01)

(52) U.S. Cl.
CPC ............. *G06Q 10/00* (2013.01); *G06Q 40/06* (2013.01)

(58) Field of Classification Search
CPC ........ G06Q 10/00; G06Q 10/06; G06Q 40/00; G06C 40/00; G06F 17/60
USPC ................................................. 705/7.24, 7.11
See application file for complete search history.

(56) References Cited

U.S. PATENT DOCUMENTS

| | | | |
|---|---|---|---|
| 6,078,960 A | 6/2000 | Ballard | |
| 8,239,509 B2 | 8/2012 | Ferris et al. | |
| 8,645,745 B2 | 2/2014 | Barsness et al. | |
| 8,997,107 B2 | 3/2015 | Jain | |
| 2002/0002576 A1* | 1/2002 | Wollrath et al. | 709/1 |
| 2008/0275939 A1 | 11/2008 | Martin | |
| 2010/0131948 A1 | 5/2010 | Ferris | |
| 2011/0161496 A1 | 6/2011 | Nicklin | |
| 2012/0016721 A1 | 1/2012 | Weinman | |
| 2012/0137001 A1 | 5/2012 | Ferris et al. | |
| 2013/0152047 A1 | 6/2013 | Moorthi et al. | |

* cited by examiner

*Primary Examiner* — Romain Jeanty
(74) *Attorney, Agent, or Firm* — Davis Wright Tremaine LLP

(57) ABSTRACT

Techniques for administrating computing resources include identifying, dynamically and/or based at least in part on historical data, a set of server computer systems expected to have availability for at least a portion of a future time period. A pricing scheme for implementing computer system instances for the future time period based at least in part on the availability of the server computer systems is generated. Accounting records in accordance with a price, determined based at least in part on the pricing scheme, for fulfilling requests to implement computer system instances for a predetermined finite amount of time are generated.

28 Claims, 10 Drawing Sheets

TECHNIQUES FOR ADMINISTRATING FINITE LIFE INSTANCES

CROSS-REFERENCE TO RELATED APPLICATIONS

This application incorporates by reference for all purposes the full disclosure of co-pending U.S. patent application Ser. No. 13/525,152, filed on Jun. 15, 2012, entitled "FINITE LIFE INSTANCES".

BACKGROUND

Computing resource providers often host computing resources, such as servers, data storage devices, networking devices, and the like, as a service to their customers. Customers can operate some of their computing infrastructure using hardware of the computing resource providers, thereby reducing the amount of upfront investment needed for the infrastructure and often resulting in an overall lower cost to the customer. Customers often are able to configure and reconfigure their infrastructure remotely and programmatically in order to best suit their needs. The computing resource providers may provide the service of hosting computing resources for a price.

BRIEF DESCRIPTION OF THE DRAWINGS

Various embodiments in accordance with the present disclosure will be described with reference to the drawings, in which.

DETAILED DESCRIPTION

Figure 1:
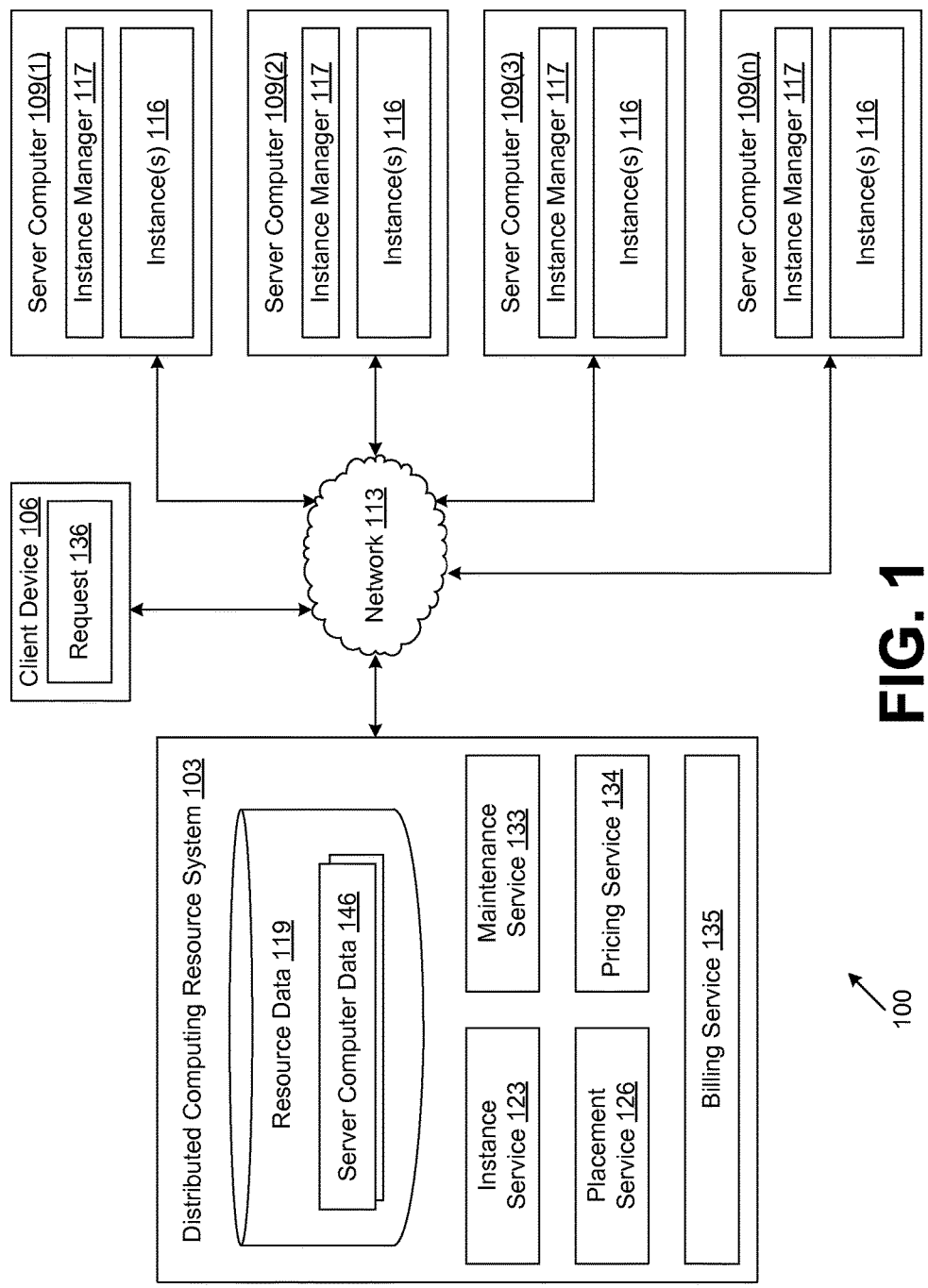
FIG. 1 illustrates a system for instantiating bounded instances and provisioning the instances to a set of implementation resources.

Systems and methods in accordance with various embodiments of the present disclosure provide approaches for pricing schemes involving finite life instances of computing resources. In some aspects, approaches are described for generating a price for creating and provisioning finite life instances based at least in part on a demand and availability of the server computers that implement the finite life instances. For example, techniques described and suggested herein include an approach for generating a price for hosting and implementing instances with a defined and/or bounded lifetime. A customer may request that one or more instances may be created with a bounded lifetime. In response, an instance service may receive the request and invoke the pricing service to generate an invoice that includes a price for creating and implementing the requested resources.

The pricing service may generate the price, either on demand as part of responding to requests to launch one or more instances or in order to publish set prices (e.g. by making publicly available on a webpage) or otherwise make the price available. The price may be generated based at least in part on a demand and availability of the server computers. To this end, the pricing service may determine the demand and availability of the server computers based at least in part on the lifetime indicated by the user, the start time indicated by the user, and the capacity of the server computers. For example, the pricing service may determine the availability of the server computers to implement the requested instances for the span of the lifetime indicated by the user. The pricing service may also determine the availability of the server computers to implement the requested instances at a time that corresponds to the start time indicated by the user. The pricing service may generate the price to correspond to the availability of the server computers and make the price available to the user and/or other users (such as by publishing the prices). For example, the pricing service may publish the prices based at least in part on historical data (e.g. data recorded, calculated and/or otherwise obtained over a time period) related to the demand and availability of the server computers. Additionally, the pricing service may also generate the prices dynamically based at least in part on the demand and availability of the server computers at the time of receiving a request for the price. In one embodiment, if the user accepts the price the instance service may create the requested instances and provision the instances on the server computers for implementation.

The pricing service may also generate and/or provide a published price for modifying previously provisioned finite life instances. For example, the user may wish to modify the previously provisioned finite life instance by reducing the lifetime, extending the lifetime, and/or converting the finite life instance into an instance having an indefinite lifetime. The pricing service may generate a price dynamically and/or provide a published price based at least in part on historical data for modifying the previously provisioned finite life instances based at least in part on the demand and availability of the server computers. For example, the price for extending the lifetime of the finite life instance may be high if other instances have been previously scheduled to be implemented during the time period that corresponds to the requested extension.

Additionally, the pricing service may generate a price and/or provide a published price for implementing finite life instances in a queue. In one embodiment, the user may request that finite life instances be implemented by an indicated date but the starting time may be irrelevant. The pricing service may generate a price dynamically and/or provide a published price based at least in part on historical data for implementing the requested finite life instances based at least in part on a convenience of implementing the instance. For example, the price may be for implementing the finite life instances based at least in part on a first in first out basis. The price may also be for implementing the instances based at least in part on a best fit approach. In this example, the instances may be implemented based at least in part on the availability of the server computers and determining which ones of the instances in the queue is best suited to be implemented for that availability. The best suited finite life instances may be based at least in part on the indicated lifetime, hardware resources associated with the instance, and/or other factors.

The pricing service may further generate a price and/or provide a published price for implementing finite life instances on a periodic basis. For example, the user may request that the finite life instances be implemented on a periodic basis, such as daily for eight hours beginning at midnight, over a number of months. In some situations, the price for implementing the instances on this periodic basis may be lower than implementing the instances under other approaches because the requested instances may be implemented during periods of high sever computer availability. In other situations, the price for implementing the instances on this periodic basis may be higher than implementing the instances under other approaches if the user requests that the period for implementing these instances occurs during periods of low server computer availability.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The environment such as that illustrated in FIG. 1 may be useful for a provider such as a distributed computing resource provider, wherein a distributed computing resource system responds to requests from customers to provide instances with a finite lifetime. In this example, the networked environment 100 includes a distributed computing resource system 103 in data communication with a client device 106 and server computers 109 over a network 113. In one embodiment, the server computers 109 may be one or more computer hardware devices that are used to implement instances 116. For example, the server computers 109 may include hardware for implementing types of computing resources, such as storage devices, virtualized storage devices, networking devices, and the like. Additionally, the implemented computing resources may be programmatically and remotely managed by a customer of the distributed computing resource provider.

The server computers 109 includes a plurality of computer system devices that are each capable of executing one or more instances 116 created by the distributed computing resource system 103. In one embodiment, each of the server computers 109 include a processor, a data store, an input/output bus, and/or any other component known in the art for executing instances 116. Additionally, the instances 116 may be virtual machine instances. A virtual machine instance, also referred to as a virtual computer system, is an instance of a software implementation of a machine (i.e., a computer) that executes programs like a physical machine. For example, each of the server computers 109 may be configured to execute an instance manager 117 capable of implementing the instances 116. The instance manager 117 may be a hypervisor or another type of program configured to enable the execution of multiple instances 116 on a single server computer 109, for example. As discussed above, each of the instances 116 may be configured to execute all or a portion of an application. Additionally, the network 113 may be similar to the network 104 (FIG. 1) as described above. The networked environment 100 may span one or more data centers, where each data center may be geographically distinct from each other. Additionally, the networked environment 100 shown in FIG. 2 may be one of several embodiments employed by the distributed computing resource provider.

In one embodiment, the distributed computing resource system 103 includes a data store containing resource data 119, an instance service 123, a placement service 126, a maintenance service 133, a pricing service 134 and/or other components. The resource data 119 may include data related to the server computers 109. For example, in one embodiment, the resource data 119 includes one or more records of server computer data 146. Each one of the records of the server computer data 146 corresponds to the server computers 109 of the networked environment 100.

The instance service 123 instantiates instances 116 based at least in part on a set of preferences provided by the customer. In one embodiment, the instance service 123 receives, from the customer on the client device 106, a request 136 to create one or more instances 116 having a bounded lifetime. In various embodiments, such requests may conform to protocols such as Representational State Transfer ("REST"), Simple Object Access Protocol ("SOAP"), XML-RPC, JSON-RPC, and the like. In some embodiments, a request may include information such as an end point for accessing a specific service, an action to perform on an endpoint, parameters for a service, and the like. A request may also include authentication data such as username and password, client IP address, digital certificate, digital signature generated using Hash-based Message Authentication Code ("HMAC"), public-key cryptography, or the like, information of an identity provider, and other any other information used to identify the client. Additionally, the request 136 received from the customer on the client device 106 may also indicate a time to start execution of the requested instances 116. In response to receiving the request, the instance service 123 instantiates instances 116 that are configured to automatically terminate after the indicated duration 239. In one embodiment, the instance service 123 may terminate the instances 116 after the indicated lifetime. For example, the instance service 123 may monitor the time of existence of the instances 116 and terminate the instances 116 when the life of the instance 116 corresponds to the indicated bounded lifetime by sending a signal to an instance manager, which in turn can terminate the instance.

The placement service 126 provisions the instances 116 to one or more of the server computers 109. In one embodiment, the placement service 126 determines the server computers 109 to provision the new instances 116 based at least in part on the indicated lifetime and/or the time to start the implementation of the new instances 116. For example, the placement service 126 may identify one or more server computers 109 with the appropriate capacity to execute the instances 116 for a length of time indicated by the lifetime and beginning at a time indicated by the start time. To this end, the placement service 126 determines the capacity of each server computer 109 from the resource data 119 stored in the data store and accordingly provisions the instances 116, as will be described.

The maintenance service 133 schedules maintenance, software updates, and/or firmware updates for the server computers 109. In one embodiment, the maintenance service 133 schedules the maintenance and software updates at an appropriate time based at least in part on the available capacity of the server computers 109. For example, the maintenance service 133 may schedule the maintenance and software updates at a time when the respective server computer 109 has a projected availability. In one embodiment, the maintenance service 133 may patch and restart the server computers 109 when the maintenance service 133 determines that the server computer 109 is not hosting any instances 116. Additionally, the maintenance service 133 may patch virtual machines associated with the instance 116 if necessary prior to instantiating new images that are associated with the respective virtual machines. For example, the maintenance service 133 may schedule a patch of the machine image based at least in part on a start time of the instances 116, and/or the expected lifetime of the instances 116 currently being implemented on the server computers 109. In one embodiment, no additional instances may be provisioned on the server computer 109 until the scheduled maintenance is completed. In another embodiment, additional instances may be provisioned on the server computer 109 if the lifetime of the additional instances correspond to the amount of time remaining until the scheduled maintenance and/or if the lifetime is less than the amount of time remaining.

The pricing service 134 generates an price transmitted to the requesting customer on the client device 106 for providing the requested instances 116 having the bounded lifetime. In one embodiment, the pricing service 134 generates the price based at least in part a duration of the lifetime indicated by the customer and the time to start execution of the requested instances 116 as indicated by the customer. Additionally, the pricing service 134 may also generate the price based at least in part on the demand and availability of the server computers 109 to execute the requested instances 116. In other embodiments, the pricing service 134 may generate the price based at least in part on a projected amount of activity of the server computers 109 where the instances 116 will be provisioned, a projected usage rate of other instances previously provisioned on the server computers 109, a projected maintenance schedule of the server computers 109, and/or other factors. Additionally, the billing service 135 generates an invoice that is transmitted to the requesting customer. The invoice may include the price generated by the pricing service 134 and may also solicit payment instrument information from the customer. The billing service 135 may also generate an accounting record that includes the price, the invoice, and the attributes of the finite life instance 116 being implemented for that price. For instance, the attributes included in the accounting record may include a duration, a start time, hardware resources associated with the instance, and/or any other attribute of the instance.

Figure 2:
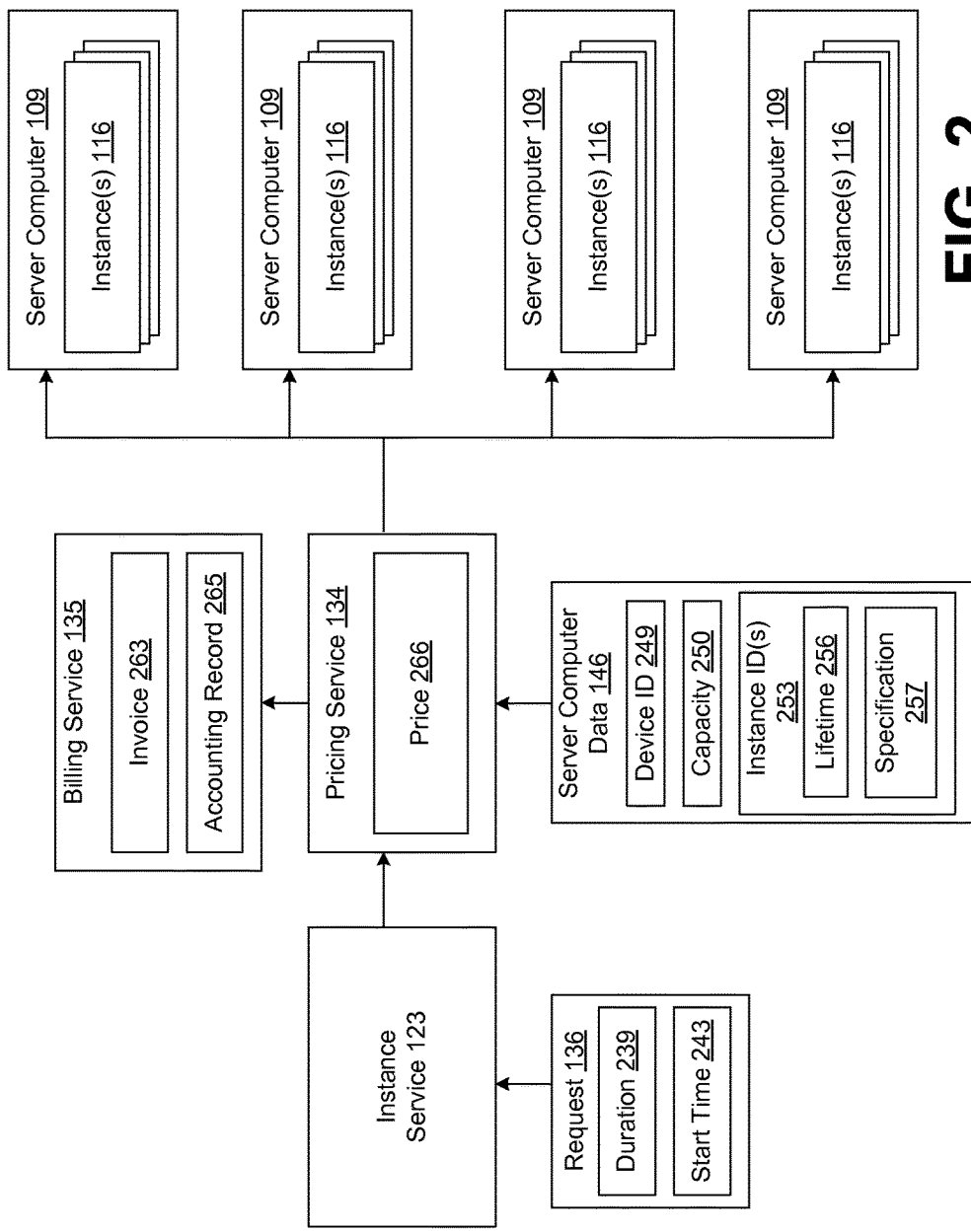
FIG. 2 illustrates components for instantiating instances with an expiration and provisioning the instances.

FIG. 2 is a computing system diagram showing aspects of several software components disclosed herein for instantiating instances having a finite lifetime. As previously discussed, the distributed computing resource system 103 includes an instance service 123 and a pricing service 134. As also discussed above, the instance service 123 receives a request 136 to instantiate at least one instance from a user on a client device 106 (FIG. 1) where the request 136 may indicate a duration 239 that corresponds to a desired lifetime of the instances 116. The request may include other information, such as parameters for instantiating instances in accordance with the various embodiments described herein. For example, the request 136 may also indicate a start time 243 that corresponds to a desired time to start the implementation of the instances 116. In this regard, the distributed computing resource system 103 may provide a Web interface through which aspects of its operation may be configured through the use of a Web browser application program executing on the client device 106. Alternatively, a standalone application program executing on the client device 106 might access an application programming interface ("API") served up by the distributed computing resource system 103 for performing the operations disclosed herein.

In one embodiment, the instance service 123 invokes the pricing service 134 to provide an invoice 263 to the customer for instantiating the requested instances 116. The invoice may include a price 266 for instantiating the requested instances 116. The instance service 123 may invoke the pricing service 134 prior to instantiating the requested instances 116. If the customer agrees to the price 266 provided by the invoice 263, the instance service 123 may instantiate the instance 116 as requested by the customer and invoke the placement service 126 to provision the new instances 116 to one or more server computers 109.

In one embodiment, the pricing service 134 generates a price 266 for creating finite life instances 116 that may be lower than instances 116 that do not have a finite life. The pricing service 134 may offer the finite life instances 116 at a lower price to promote the prevalence of finite life instances 116. For example, managing and provisioning fleets of finite life instances 116 may be more advantageous than instances that do not have a finite lifetime because of the predictability of the duration of the finite life instance 116. By offering finite life instances 116 at a lower price than instances without a finite life, the pricing service 134 may promote the use of finite life instances 116.

Additionally, the pricing service 134 may also generate the price 266 based at least in part on a demand and availability of the server computers 109 to implement the requested instances 116 for the span of the indicated duration 239 beginning at a time that corresponds to the start time 243. For example, a higher price 266 may be associated with creating instances 116 as requested by the customer when the availability of the server computers 109 to implement the requested instances 116 is limited. In one embodiment, the pricing service 134 may generate an invoice 263 that includes a higher price 266 when the server computers 109 are burdened with implementing a threshold number of previously provisioned instances 116. In another embodiment, the pricing service 134 may generate an invoice 263 that includes a lower price 266 when the server computers 109 are not burdened and/or are idle. For example, the server computers 109 may be implementing less than a threshold number of previously provisioned instances 116. The pricing service 134 may determine the demand of the server computers 109 and generate a price 266 based at least in part on the demand and availability of the server computers 109.

In one embodiment, the pricing service 134 may determine the demand and/or activity level of the server computers 109 based at least in part on information available in the server computer data 146. The server computer data 146 stores a record of information for each server computer 109 in communication with the distributed computing resource system 103. For example, each server computer 109 may have a unique device ID 249 such as a unique alphanumeric identifier, and/or another unique character string that uniquely identifies the server computer 109. Additionally, each one of the records of the server computer data 146 may also include a capacity 250 listing the hardware specifications of the corresponding server computer 109. For example, the capacity 250 may include a total amount of available memory, a total number of virtual computation units, a total amount of data storage, a type(s) of encryption, a bus speed, and/or any other type of hardware specification, as can be appreciated. Each server computer 109 may be associated with a resource unit value that corresponds to an amount of resources allocated to the server computer 109. The virtual computation unit may, for example, be an abstraction of a set of computer resources and therefore, represent a certain amount of processor usage, a processor speed, an amount of RAM, and other characteristics of a hardware computing device's resources that are allocated to the server computer 109. It should be noted that the computer resources may not be exclusively allocated to the server computer 109. In one embodiment, the computer resources may be allocated, such that, for example, over a period of time, the server computer 109 has at least the corresponding amounts of computer resources available to it.

Additionally, the server computer data 146 includes a listing of instance IDs 253, each of which may be unique. As discussed above, each server computer 109 may host one or more instances 116 at any given time. The listing of instance IDs 253 includes a unique identifier for each one of the instances 116 being hosted by and/or previously provisioned on the server computer 109 (with the device ID 249). Included in the listing of instance IDs 253 are a lifetime 256 and a specification 257 for each of the instances 116 of the listing. In one embodiment, the lifetime 256 may be represented by an amount of time remaining in the life of the instance 116, a time at which the instance 116 is scheduled to be terminated, a time indicating a duration 239 of the instance 116 that may have been established during creation of the instance 116, and/or other information that corresponds to the lifetime 256 of the instance 116. The specification 257 represents the amount of hardware resources associated with the instance 116. For example, the specification 257 may include the amount of memory, the number of virtual computation units, the amount of data storage, and/or other resources requested by the user for executing the instance 116.

The pricing service 134 generates the price 266 based at least in part on the demand of the server computers 109. In one embodiment, the pricing service 134 determines the availability of each server computer 109 from the server computer data 146 associated with the server computers 109. In one embodiment, the placement service 126 identifies the previously provisioned instances 116 for each server computer 109 from the listing of instances IDs 253 stored in the server computer data 146. For example, each of the previously provisioned instances 116 may be identified by the unique instance ID 253. The placement service 126 then identifies the remaining lifetime 256 of the previously provisioned instances 116 on each of the server computers 109. In one embodiment, the lifetime 256 may be represented by a time in the future when the corresponding instance 116 is scheduled to terminate. In another embodiment, the lifetime 256 may be represented by an amount of time remaining until the corresponding instance 116 terminates.

Having identified the lifetime 256 for the previously provisioned instance 116, the pricing service 134 then determines an amount of resources dedicated to the implementation of the previously provisioned instances 116. In one embodiment, the pricing service 134 identifies the specification 257 associated with each of the previously provisioned instances 116. For example, the specification 257 may indicate an amount of memory, number of computing units, amount of data storage, and/or other resources of the server computer 109 already committed towards the implementation of the previously provisioned instances 116. From the specification 257 and the lifetime 256 associated with each of the previously provisioned instances 116 of the server computer 109, the pricing service 134 determines the availability of the server computer 109 to host the new instances 116. In one embodiment, the pricing service 134 determines an amount of resources of the server computer 109 previously committed for the implementation of the previously provisioned instances 116. For example, the pricing service 134 aggregates the amount of resources indicated by the specification 257 of each one of the previously provisioned instances 116 and compares the aggregated specifications 257 with the capacity 250 of the server computer 109. If the aggregated amount of resources indicated by the specification 257 exceeds a certain predetermined threshold, the pricing service 134 may determine that the server computers 109 are in demand. If the aggregated amount of resources indicated by the specification 257 is less than another predetermined threshold, the pricing service 134 may determine that the server computers 109 are not in demand.

The pricing service 134 may also determine the capacity 250 of the server computer 109 over the duration 239 indicated by the user for determining the demand of the server computers 109. For example, one or more of the previously provisioned instances 116 may be scheduled to execute at some time in the future. As such, an amount of the capacity 250 currently available may already be committed towards the execution of the previously provisioned instances 116. In this example, the pricing service 134 determines whether the capacity 250 currently available remains available throughout the duration 239 of the new instances 116.

The pricing service 134 may also determine the demand and availability of the server computers 109 at the start time 243 indicated by the user. For example, the server computer 109 may lack sufficient capacity 250 at the current time. However, the previously provisioned instances 116 currently being executed by the server computer 109 may terminate before the start time 243 indicated by the user. In this embodiment, the pricing service 134 determines whether a server computer 109 has sufficient capacity 250 to execute the new instances 116 starting from a time in the future that corresponds to the start time 243. To this end, the pricing service 134 identifies the lifetimes 256 for the each of the previously provisioned instances 116 that are currently being executed by the server computer 109. If the lifetimes 256 indicate that the previously provisioned instances 116 will terminate prior to the start time 243 of the new instances 116, the pricing service 134 determines that the available capacity 250 of the server computer 109 increases prior to the start time 243 of the new instances 116. Similarly, if the lifetimes 256 indicate that the previously provisioned instances 116 will not terminate prior to the start time 243 of the new instances 116, the pricing service 134 determines that the available capacity 250 of the server computer 109 does not increase prior to the start time 243 of the new instances 116.

In another embodiment, the pricing service 134 may determine that one or more of the server computers 109 are being underutilized. For example, a number finite life instances 116 previously provisioned to the server computers 109 may not require all of the resources associated with the instance. In this embodiment, the pricing service 134 may generate a price 266 and/or provide a published price 266 for oversubscribing the resources of a server computer 109. The placement service 126 may provision new instances 116 to the server computer 109 to utilize the idle resources associated with the previously provisioned instances 116. To this end, the pricing service 134 may generate and/or provide a published lower price 266 for implementing the requested instances 116 by oversubscribing resources associated with previously provisioned instances 116. For example, the pricing service 134 may determine if the resources, duration 239, and/or start time 243 associated with the requested instances 116 correspond with the idle resources associated with the previously provisioned instances 116. The pricing service 134 may generate a price 266 based at least in part on the correspondence.

The pricing service 134 may also determine the demand and availability and capacity of the server computers 109 based at least in part on the available slots associated with each server computer 109. For example, each slot may be associated with a predetermined amount of hardware resources. The resources may include processing capacity, memory capacity, disk storage capacity, a type of encryption platform, and/or other computing resources that facilitate implementation of an instance 116. In one embodiment, the collection of server computers 109 may be viewed as a data center that includes virtual machine slots, physical hosts (i.e., server computers 109), power supplies, routers, isolation zones, and geographic regions. The server computers 109 may be shared by multiple virtual machine slots, where each slot may be capable of holding a guest operating system. Additionally, multiple server computers 109 may share a power supply, a router may serve multiple server computers 109 across several power supplies, an isolation zone may server many routers, and multiple isolation zones may reside at a geographic location, such as a data center. Additionally, the number of slots associated with a server computer 109 may change. For example, new slots may be drawn to be in association with the server computer 109 when all of the old slots are being used for implementing instances 116. Thus, each server computer 109 may be associated with a predetermined number of slots. Each slot may be configured to implement one instance 116 where the resources associated with the instance 116 correspond to the resources associated with the slot. For example, the amount of resources associated with a slot may be a standard predetermined amount. In one embodiment, the amount of resources associated with the slot may be modified to a non-standard amount. For example, the processing capacity and/or the memory capacity may be increased or decreased to a non-standard amount for the duration 239 of a finite life instance 116. The pricing service 134 may identify a number of available slots for each of the server computers 109 and accordingly determine an availability of the server computers 109. In another embodiment, the pricing service 134 may identify a number of available slots for each server computer 109 based at least in part on historical data related to the availability of the server computers 109. Additionally, the pricing service 134 may also identify a number of available slots that may be modified to be associated with a non-standard amount of hardware resources for the indicated duration 239 to determine the availability of the server computers 109.

In another embodiment, the pricing service 134 may determine the total available capacity of the server computers 109 for a given period. For example, the total available capacity may include the available processing capacity, available memory capacity, available disk storage capacity, available types of encryption platform, and/or other available computing resources for the period. In one embodiment, the total available capacity may be determined based at least in part on the historical data. The pricing service 134 may then divide the total available capacity amongst the slots of the server computers 209, evenly or otherwise. For example, an equal amount (i.e., a standard amount) of the available hardware resources may be associated with each of the slots. The amount of resources associated with each slot may be modified, as discussed above. The pricing service 134 may then generate a price 266 for implementing the requested instances 116 based at least in part on the available number of slots, the amount of resources associated with the requested instances 116, the duration 239 associated with the requested instances 116, and/or another factor discussed herein.

Having determined the availability of the server computers dynamically and/or based at least in part on historical data, the pricing service 134 determines the price 266. In one embodiment, the pricing service 134 determines that the price 266 for creating the finite life instances 116 is lower when the placement service 126 indicates that the server computers 109 are available to implement the requested instances 116. For example, if the availability exceeds a threshold amount, the pricing service 134 determines that the price 266 to create the requested instances 116 is lower than if the availability does not exceed the threshold amount. A lower price 266 may encourage the user to purchase the requested instances 116, thereby allowing the distributed computing resource system 103 to utilize the idle server computers 109.

Similarly, if the availability as determined by the placement service 126 exceeds a another threshold amount, the pricing service 134 may determine that the price 266 to create the requested instances 116 is higher than if the availability does not exceed the other threshold amount. In some situations, implementing too many instances 116 simultaneously may adversely affect the server computer 109. For example, the processing speed of the processors may fall below a desired speed causing the instances 116 being implemented on the server computers 109 to be executed at less than a desired speed. Additionally, the server computers 109 may overheat and/or may otherwise be adversely affected creating the potential for the previously provisioned instances 116 being implemented on the server computers 109 to crash and/or otherwise malfunction. A higher price 266 may dissuade the user from purchasing the requested instances 116, thereby allowing the distributed computing resource system 103 to implement the previously provisioned instances 116 under desired conditions. In another embodiment, the pricing service 134 may utilize a flat price 266 for implementing the requested instances 116. For example, the pricing service 134 may generate the flat price 266 that is independent of the demand and availability of the server computers 109. Assuming that the customer agrees to the flat price 266, the request instances 116 may be implemented (for example, by the instance server 123). On a subsequent access, the pricing service 134 may determine the demand and availability of the server computers 209 and adjust the price 266 for implementing the requested instances 116. For instance, the pricing service 134 may offer a refund and/or a credit to the customer if the flat price 266 was too high and/or may charge an extra amount to the customer if the flat price 266 was too low (for example, the difference in price).

Upon determining the price 266, the pricing service 134 publishes the price 266. For example, the pricing service 266 may publish the price by invoking the billing service 135 to generate the invoice 263. The invoice 263 may be provided to the user on the client device 106 on a network page transmitted over the network 113. In another embodiment, the invoice 263 may be provided to the user via a user interface rendered on the client device 106 of the user. The user may agree to the price 266 listed on the invoice 263 by transmitting an indication of agreement such as, for example, invoking a URL and/or an API call. In one embodiment, the determined price 266 may only be valid for a predetermined amount of time. For example, the demand and availability of the server computers 109 may change when unexpected new instances 116 are implemented, existing instances 116 are unexpectedly terminated, the duration 239 of existing instances 116 is modified, and/or other activities that may not be determined from historical data. Accordingly, the price 266 reflected on the invoice 263 may be associated with a timer and the expiration of the timer may signal the expiration of the price 266.

Upon receiving an indication of purchasing the implementation of the requested instances 116 for the price 266, the pricing service 134 invokes the billing service 135 to generate an accounting 265 of the transaction. For example, the billing service 135 may include the purchase price 266, any payment instrument information provided by the customer, attributes of the instances 116 to be implemented, and/or any other information related to the transaction. The pricing service 134 may also invoke the instance service 123 to instantiate the requested instances 116 according to the user preferences. For example, the instance service 123 may create or otherwise obtain (e.g. from data storage) a machine image that includes the applications, libraries, data and configuration settings provided by the user and specifies the operating system in which to execute the instance 116, as indicated by the user. Additionally, the instance service 123 pairs the machine image with the instantiated instances 116 and configures the instances 116 to automatically terminate at a time corresponding to the duration 239. For example, the duration 239 may be a length of time for which the instances 116 should exist and/or a time in the future at which the instances 116 should be terminated, as discussed above. In another embodiment, the instance service 123 may instantiate instances 116 that are manually terminated. In this embodiment, the instance service 123 may store the duration 239 as the lifetime 256 in the listing of instance IDs 253 associated with the instantiated instance 116. The instance service 123 may then monitor and terminate the instances 116 when the lifetime 256 for the each instance expires, as can be appreciated. In one embodiment, the instances 116 being terminated may instead be retained if the resources implementing the instances 116 have spare capacity. For example, the user may have requested to restart at a later time the instances 116 being terminated. In this example, the instances 116 may be retained for the restart. Upon termination, the resources of the server computer 109 used to implement the instances 116 may be recovered for implementing other instances 116.

In one embodiment, the pricing scheme generated by the pricing service 134 may offer a discount on the price 266 for advanced purchasing. For example, if the requested finite life instances 116 are associated with a start time 243 a threshold amount of time in the future, the price 266 for implementing the requested instances 116 may be discounted relative to a price 266 provided to a user requesting to implement the same instances 116 associated with the same start time 243 but the request is received later in time. In another embodiment, the price 266 for implementing the finite life instances 116 may be based on the duration 239 associated with the instances 116 compared to a launching time of the server computers 209 for implementing the instances 116. For example, if the amount of time needed to launch the server computer 209 scheduled to implement the instance 116 exceeds a percentage (or other measurement) of the duration 239 of the instance 116, the pricing service 134 may generate a higher price 266 than if the launching time for the server computer 209 does not exceed the percentage of the duration 239. The server computers 209 may need to be powered on and implement initial processes before implementing instances 116 which may cause significant consumption of power and/or processing capacity.

In one embodiment, the user may wish to modify the duration 239 of the finite life instances 116 after they are provisioned. For example, the duration 239 may be extended to be implemented for a longer period or may be shortened to be implemented for a shorter period. The user may request to modify the duration 239 of the instances 116 via a network page and/or an API call. In one embodiment, the instance service 123 may receive the request to modify the duration 239 and invoke the pricing service 134 to determine the price 266 to modify the duration 239 as requested. To this end, the pricing service 134 may determine the availability of the server computers 109 to implement the instances 116 for the modified duration 239. Extending the duration 239 of an instance 116 already provisioned on one of the server computer 109 may be costly. For instance, the instance 116 may have been provisioned to a certain server computer 109 based at least in part on the original duration 239 indicated at the time of creation. Additionally, the server computer 109 may not have the availability and/or capacity 250 to continue implementing the instance 116 beyond the original duration 239. For example, other instances 116 may have been provisioned to begin implementation upon the expiration of the original duration 239. To accommodate the modified duration 239, the placement service 126 may need to re-provision the other instances 116 and/or the user's instance 116 to another server computer 109. In one embodiment, the price 266 for extending the duration 239 may be high to cover any expenses related to the re-provisioning. For instance, the price 266 to extend the duration 239 to a new period may be higher than the price 266 if the user originally requested that the instance 116 have a duration 239 until the new period. In one embodiment, the price 266 to extend the duration 239 to a new period may be based on an hourly price, a fixed price, and/or another periodically determined price.

Additionally, the server computers 109 implementing the user's instances 116 may be scheduled for maintenance. For example, the placement service 126 may have provisioned instances 116 such that the instances 116 on a particular server computer 109 are scheduled to terminate simultaneously to allow for maintenance to be performed. In one embodiment, the maintenance service 133 may perform the maintenance, as can be appreciated. The maintenance may involve rebooting the server computers 109 and may also require that the resources implementing the instances 116 be reclaimed. Extending the duration 239 of the already provisioned instances 116 may be costly if there is a need to reclaim the resources. For example, the maintenance may need to be rescheduled, the other instances 116 may need to be re-provisioned, and/or other actions performed to accommodate the extension of the duration 239. Delaying the maintenance may render the server computers 109 vulnerable to failure, attacks, and/or other malfunctions. In one embodiment, the pricing service 134 may generate a price 266 that reflects the cost of extending the user's instance 116.

In another embodiment, the user may wish to convert the previously provisioned finite life instance 116 to an indefinite instance 116. For example, the user may wish to modify the duration 239 so that there is no defined time of termination of the previously provisioned instance 116. Converting a finite life instance 116 to an indefinite life instance 116 may be costly as discussed above. For instance, other instances 116 may need to be re-provisioned to accommodate the user's instance having an indefinite lifetime. The price 266 to convert the finite life instance 116 to an indefinite life may be higher than if the user originally requested that the instance be indefinite. In one embodiment, if the user accepts the price 266, the instance service 123 may modify the previously provisioned finite life instance 116 to remove the duration 239. For example, the instance service 123 may remove an indication to terminate the previously provisioned finite life instance 116 at a time corresponding to the duration 239. Additionally, the placement service 126 may then determine to re-provision the instance 116 to another server computer 109 based at least in part on the demand and availability of the server computers 109.

In one embodiment, the user may wish to modify the duration 239 to shorten the lifetime of the previously provisioned finite life instance 116. Stated another, the user may wish to sell back a portion of the duration 239 of the previously provisioned finite life instance 116. For example, the user may transmit a request to sell back a portion of the duration 239 via a network page and/or an API call. In response, the pricing service 134 may generate a price 266 for buying back the excess portion of the duration 239. Additionally, the pricing service 134 may also publish the price 266 for buying back the excess portion of the duration 239 without receiving a request from the user. In one embodiment, the price 266 for buying back the excess portion of the duration 239 may be solicited to customers in a marketplace for implementing instances 116. To this end, the pricing service 134 may determine the demand and availability of the server computers 109, dynamically and/or based at least in part on historical data, during the portion of the duration 239 that the user wishes to sell back. Other instances may be waiting and/or be historically waiting to be implemented on the server computers 109 during the portion of the duration 239 that user wishes to sell back. Reclaiming the resources occupied by the user's instance 116 may be applied towards implementing the other instances. In this example, the pricing service 134 may offer a price 266 higher than if there was no demand for the server computers 109. If other instances are not waiting and/or historically not waiting to be implemented on the server computers 109 during the portion of the duration 239 that the user wishes to sell back, then there may not be a need to reclaim the resources occupied by the user's instance 116. In this example, the pricing service 134 may offer a lower price. In another embodiment, the user may indicate a price at which portion of the duration 239 may be purchased back. In one embodiment, the pricing service 134 may accept or reject the offered price based at least in part on the demand and availability of the server computers 109, as described above. The pricing service 134 may also follow a similar approach if the user requests modifying the start time 243. In one embodiment, if the user accepts the price 266, the instance service 123 may modify the duration 239 of the previously provisioned finite life instance 116. Additionally, the placement service 126 may then determine to re-provision the modified previously provisioned finite life instance 116 to another server computer 109 based at least in part on the demand and availability of the server computers 109.

Additionally, the user may wish to modify the amount of resources associated with the previously provisioned finite life instance 116. For example, the user's instance 116 may be associated with an excessive amount and/or a deficient amount of hardware resources. Implementing the instance 116 may only require a portion of the total resources allocated for the instance 116. In one embodiment, the user may transmit a request to sell back a portion of the allocated resources. The pricing service 134 may determine the demand and availability of the server computers 109 for the duration 239 of the instance 116 and generate a price 266 to purchase back the excess resources based at least in part on the determined demand and availability. The pricing service 134 may also provide a published price 266 for purchasing back a portion of previously allocated resources without receiving a request by the user. In another embodiment, the user may submit an offer price to sell back the excess resources. The pricing service 134 may determine whether to accept or reject the offer based at least in part on the demand and availability of the server computers 109. Similarly, the instance 116 may require additional amounts of resources allocated for the instance 116. In one embodiment, the user may transmit a request to purchase additional amounts of resources to be associated with the instance 116.

In one embodiment, the pricing service 134 may receive bids from a user for implementing instances 116. In particular, the user may offer a bid price for purchasing the finite life instances 116. For example, the user may request that finite life instances 116 be created having a specified duration 239 and/or start time 243, and also provide a bid price at which to purchase the requested instances 116. In particular, the user may offer a bid price to be less than a default price in an effort to be cost conscious. The pricing service 134 may then determine whether the bid price offered by the user is feasible. To this end, the pricing service 134 may invoke the placement service 126 to determine the availability and demand of the server computers 109 to implement the requested instances 116. If the placement service 126 indicates that the availability of the server computers 109 is minimal and/or below a threshold, the pricing service 134 may reject the bid price offered by the user. If the placement service 126 indicates that the availability of the server computers 109 is excessive and/or above a threshold, the pricing service 134 may accept the bid price offered by the user.

In another embodiment, the pricing service 134 may employ a need-based approach for generating and/or providing the published price 266. For example, the user may indicate a future time and/or date for completing the implementation of the requested instances 116. The distributed computing resource system 103 may implement the requested instances 116 at any time provided that the implementation is complete by the indicated time. In this embodiment, the pricing service 134 may generate a price 266 and/or provide a published price 266 for implementing the requested instances 116 via this need-based approach. For example, the pricing service 134 may generate the price 266 based at least in part on the availability of the server computers 109 and/or historical availability of the server computers 109 between the time of receiving the request and the indicated time of completion. In particular, the pricing service 134 may determine availability for a period of time that corresponds to the duration 239 indicated by the user between the time of receiving the request and the indicated time of completion. If the placement service 126 determines that the period of availability corresponds to the indicated duration 239, the pricing service 134 may generate the invoice 263 and/or publish the price 266 for the user with a price 266. In this embodiment, the price 266 may be cheaper than if the user indicated the start time 243 because the requested instances 116 may be implemented at a time with the server computers 109 are idle and/or have availability. In one embodiment, if the user accepts the price 266, the placement service 126 may provision the finite life instance 116 to be implemented based at least in part on the need-based approach. For instance, the placement service 126 provisions the finite life instance 116 at a time that the server computers 109 are available such that the implementation of the finite life instances 116 are complete prior to the specified date of completion.

The pricing service 134 may also generate and/or provide a published price 266 for reserved resources. For example, the pricing service 134 may generate a price 266 for allowing users to reserve resources on the server computer 109 for a period of time but only implement finite life instances 116 on those reserved resources for portions of that time. In one embodiment, the user may transmit a request to reserve an amount of resources of the server computer 109 for a year and/or some other period but only require use of those resources for a portion of the requested period. For example, the portion of the requested period to be used may be at certain times every day, week, month, etc. In this example, the pricing service 134 may determine the availability, dynamically and/or based at least in part on historical data, of the requested amount of resources on the server computers 109 over the requested period and the availability of those resources during the portion of the requested period. The pricing service 134 may then generate and/or publish the price 266 based at least in part on the determined availability.

The pricing service 134 may also generate and/or provide a published price 266 based at least in part on an option pricing approach. In one embodiment, the user may transmit a request to reserve an amount of resources of the server computers 109 for a period of time at some future time with an option to purchase the reserved resources to implement finite life instances 116. For example, the pricing service 134 may generate and/or provide the published price 266 based at least in part on the availability and/or historical availability of the server computers 109. In another embodiment, the pricing service 134 may generate and/or provide the published price 266 based at least in part on historical and/or other information related to a projected availability of the server computers 109. The user may pay a premium for the ability to optionally purchase the requested resources.

Additionally, the pricing service 134 may also generate and/or provide a published price 266 based at least in part on the size and magnitude of the instance 116 requested by the user. In one embodiment, pricing service 134 may generate and/or provide a lower published price 266 when the user purchases instances 116 in bulk. For example, the user may request a large quantity of resources for implementing the instance 116, a longer duration 239 for implementing the instance 116, and/or a larger number of individual instances 116. In one embodiment, the pricing service 134 may determine if the requested size and magnitude of the instances 116 exceeds a bulk rate threshold. If the requested size and magnitude of the instances exceed the bulk rate threshold, the pricing service 134 may generate and/or provide a lower published price 266 for implementing the requested instances 116.

In a further embodiment, the pricing service 134 may generate and/or provide the published price 266 based at least in part on the software associated with the requested instances 116. In one embodiment, the software associated with the instances 116 may require a license fee for use. The pricing service 134 may generate the price 266 to correspond to the license fee.

Figure 3:
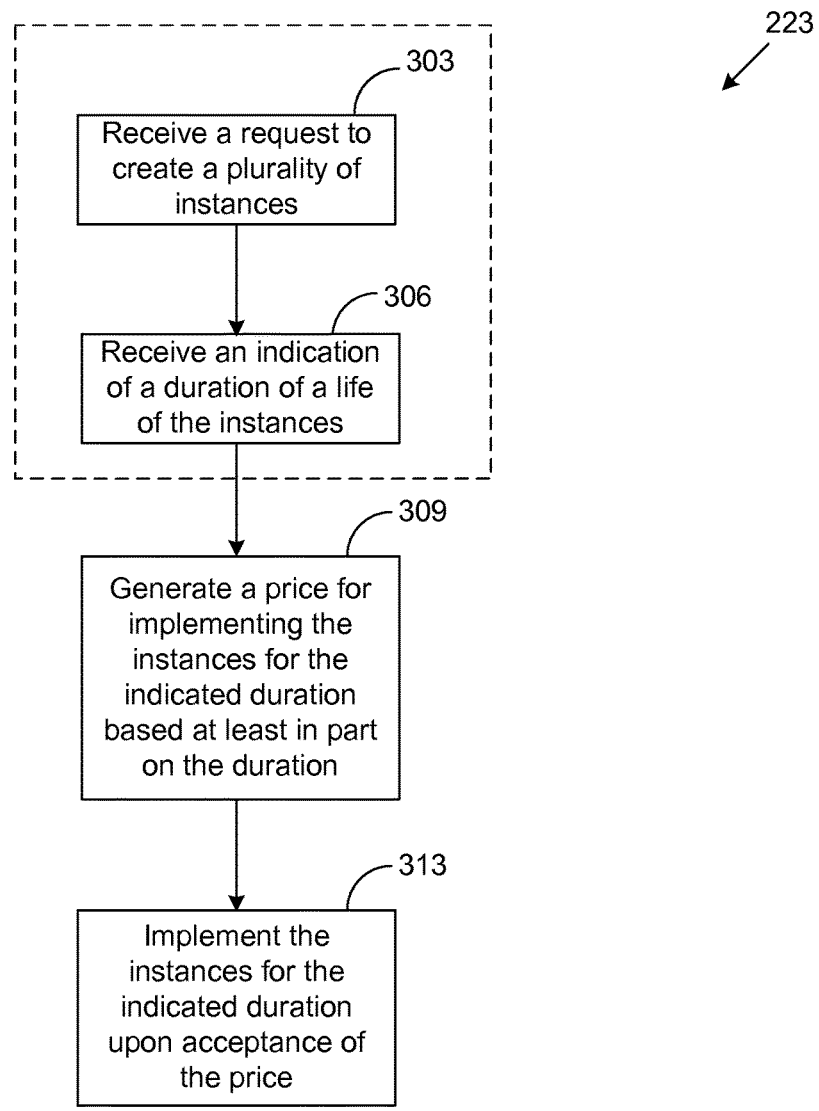
FIG. 3 is a flow chart illustrating an exemplary method for generating a price to create and implement finite life instances.

FIG. 3 is a flowchart that illustrates steps of a process to generate a price 266 (FIG. 2) for creating and implanting instances 116, which may be performed by the pricing service 134 described in connection with FIG. 1 and FIG. 2, according to certain embodiments.

Beginning with step 303, the pricing service 134 receives an indication of a request 136 (FIG. 1) from a user on the client device 106 (FIG. 1) to create a plurality of instances 116. Additionally, in step 306 the pricing service 134 may receive an indication of a duration 239 (FIG. 2) of a life of the instances 116, although such information may be received separately from the request 136. As noted, the duration 239 may be indicated by a length of time and/or a time in the future at which to terminate the instances 116. In one embodiment, the instance service 123 may also receive a start time 243 (FIG. 2) that indicates a time in the future at which to create the instances 116. Additionally, the functionality described in steps 303 and 306 may be performed simultaneously and/or in one step, as denoted by the dotted line. In step 309, in an embodiment, the pricing service 134 generates a price 266 for implementing the requested instances 116 for the indicated duration based at least in part on the duration. For example, the pricing service 134 determines an availability of the server computers to implement the requested instances 116 for the indicated duration 239. In another embodiment, the pricing service 134 may also determine the availability of the server computers to implement the requested instances 116 for the indicated duration 239 beginning at the indicated start time 243. The pricing service then generates the price 266 to correspond to the determined availability of the server computer. Then, in step 313, in an embodiment, the pricing service 134 transmits an indication to the instance service 123 (FIG. 1) to implement the requested instances 116 for the indicated duration 239 upon receiving an acceptance of the price 266. The instance service may then, upon receipt of the indication, implement the requested instances, such as described above.

Figure 4:
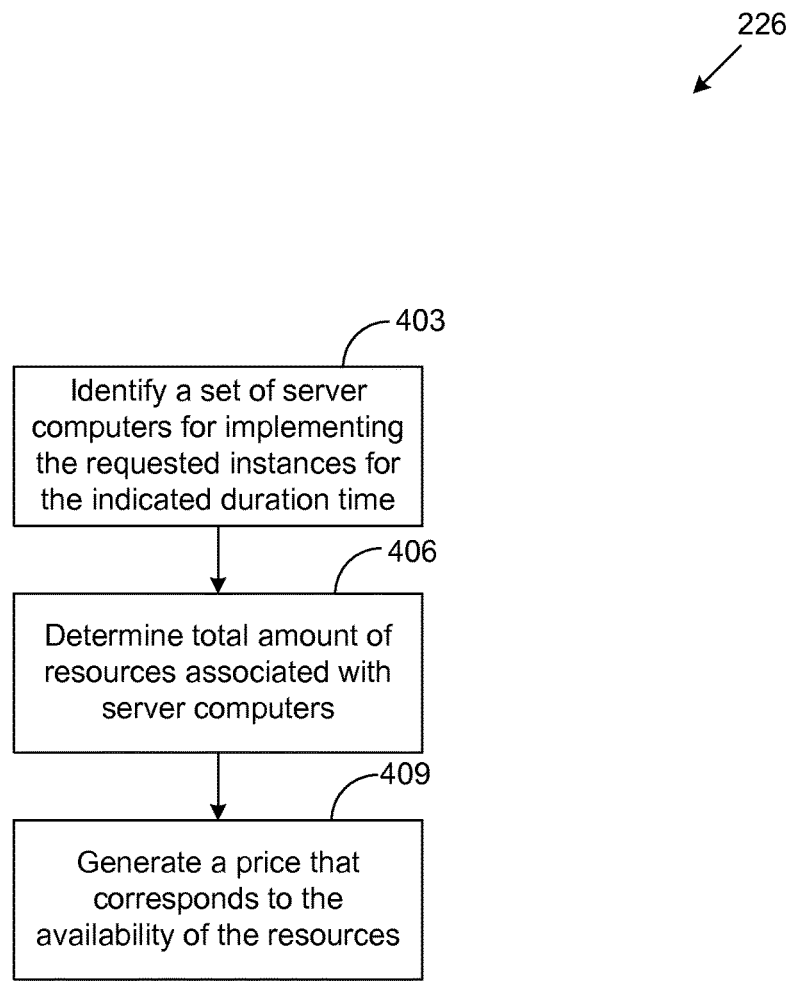
FIG. 4 is a flow chart illustrating an exemplary method for determining availability of server computers to implement finite life instances.

FIG. 4 is a flowchart that illustrates steps of a process to pricing service 134 for generating a price 266 to implement instances 116 having a bounded lifetime based at least in part on an availability server computers 109 (FIG. 1), according to certain embodiments. Beginning with step 403, the placement service 126 identifies a set of possible server computers 109 for implementing the instance 116 for the indicated duration 239. In one embodiment, the pricing service 134 may identify the possible server computers 109 (FIG. 1) associated with the distributed computing resource system 103 (FIG. 1). Then, in step 406, the pricing service 134 determines an availability of the resources associated with the server computers 109 for the indicated duration 239. In one embodiment, the pricing service 134 determines a total amount of resources associated with the server computers 109 and an amount of those resources committed to implementing previously provisioned instances during the span of the duration 239. For example, the pricing service 134 may determine the availability to be a percentage of the resources available for implementing the requested instances. Then, in step 409, the pricing service 134 generates a price 266 that corresponds to the availability of the server computers 109. In one embodiment, the price 266 may be higher if the availability of the server computers 109 is determined to be limited. For example, the pricing service 134 may determine if the availability is below a first predetermined threshold. If the availability falls below the first threshold, the pricing service 134 may generate the price 266 to be high. A high price 266 may discourage a purchase of the instances 116 thereby allowing the distributed computing resource system 103 to conserve limited resources. The pricing service 134 may also determine if the availability is above a second predetermined threshold. If the availability exceeds the second threshold, the pricing service 134 may generate the price 266 to be low. A low price 266 may encourage a purchase of the instances 116 thereby allowing the distributed computing resource system 103 to use idle resources.

In some embodiments, the pricing service 134 determines different prices for the same type of available capacity. As an example, for a future time period, there may be available capacity for a certain number of instances of a particular type (i.e. instances having particular resource usage specifications). Instances for the type may be priced at different amounts. In some instances, multiple prices for the same type of capacity may be presented concurrently to the customers. The multiple prices may be calculated to maximize/optimize revenue, profit, and/or some other financial metric or combination of metrics. For instance, pricing for multiple instances of the same type can be calculated according to a mathematical model that is based on historical data related to sales of instance types at different prices. The model may, for instance, allow for predictions based on historical data of how many instances will be sold (e.g. how many instances will be operated on behalf of a customer) at various prices. The model can then be used to maximize or otherwise optimize one or more financial metrics. In this manner, for instance, some instances can be priced low (i.e. low relative to other instances of the same type being available to customers concurrently), which generally corresponds to a higher likelihood that the instances will be sold during some time period. By only pricing some instances low, capacity can be reserved to take into account an expected demand for instances by customers willing to pay higher prices. The same instance type may be priced at multiple price tiers based at least in part on expected demand at each tier. Further, such pricing may be performed for multiple instance types.

In embodiments where the same instance type is offered for sale at different prices, different conditions may be associated with different prices. For example, as discussed herein, various pricing schemes may incorporate disproportionate prices for changes in an instances' duration. Accordingly, in some embodiments, the amount of disproportionality may vary according to the instance price. For instance, instances priced low may have non-refundable durations. A customer purchasing such an instance may pay for the entire duration of the instance without the ability to change the duration whereas customers purchasing higher priced durations may be able to use only a portion of the duration and receive a refund (or lower invoice total) for the unused portion of the duration. As yet another example, the price per time unit (e.g. hour) charged to a customer for unused refundable time may vary according to initial instance prices. In this manner, customers who purchase lower priced instances may be refunded/credited less for unused time whereas customers who purchase higher priced instances may be refunded/credited more for unused time. Further, in some embodiments, pricing tiers for finite life instances may correspond to different service level agreements. As one example, customers who pay low prices for instances may lack a guarantee that the instance will not be terminated, for example, to create additional capacity. Customers who pay higher prices may have such guarantees. This allows the ability to offer for sale more capacity than may be available because, in the event more capacity is requested than available, customers who have paid lower prices are subject to instance termination to make additional capacity available.

Figure 5:
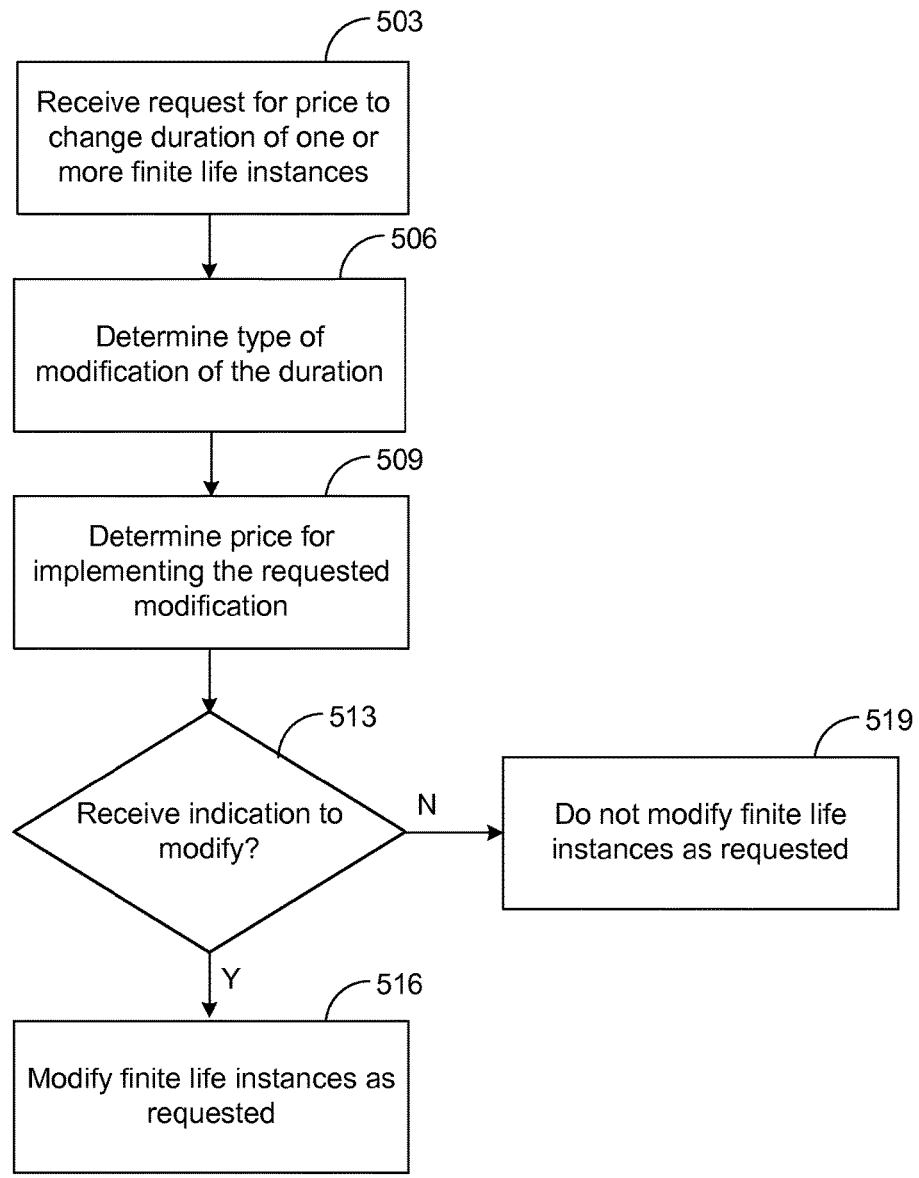
FIG. 5 is a flow chart illustrating an exemplary method for generating a price to modify previously created finite life instances.

FIG. 5 is a flowchart that illustrates steps of a process for the pricing service 134 to generate a price 266 if a user requests and/or desires a change in the finite life instances 116 (FIG. 1), according to certain embodiments. For example, the user may wish to modify the duration 239 (FIG. 1) of previously provisioned finite life instances 116 (FIG. 1) to shorten and/or lengthen the period of time. The finite life instances 116 may need to be implemented for a shorter and/or a longer period of time than initially projected. To this end, the pricing service 134 may generate and/or provide a published price 266 for modifying the previously provisioned finite life instances 116. Beginning with step 503, the pricing service 134 receives a request to provide a price 266 (FIG. 1) for modifying a duration 239 (FIG. 2) associated with a plurality of previously provisioned finite life instances 116. For example, the user may transmit the request by manipulating one or more network pages rendered on a display of the client 106 (FIG. 1) and/or invoking an API call. In another embodiment, the pricing service 134 may generate a price 266 for modifying the duration 239 that may be published and provided to one or more users. In step 506, the pricing service 134 determines the type of modification to be made to the finite life instances 116. In one embodiment, the user may request to reduce the term of the duration 239, extend the term of the duration 239, convert the finite life instance 116 to an instance without a definite expiration time, and/or another form of modification.

Then, in step 509, the pricing service 134 determines a price 266 (FIG. 2) that corresponds to the requested modification. Determining a price may include accessing a predetermined price from a data store. The price may also be generated dynamically and/or based at least in part on historical data. For example, if the request indicates a reduction in the duration 239 (i.e., the user is requesting to sell back a portion of the duration 239), the pricing service 134 determines, dynamically and/or based at least in part on historical data, the demand and availability of the server computers 109 (FIG. 1) for the period of time that corresponds to the reduction in duration 239. If the pricing service 134 determines that the server computers 109 are in demand (i.e., other instances 116 are waiting to be implemented), the pricing service 134 may determine that demand for the server computers 109 is high. Accordingly, the pricing service 134 generates a price 266 that encourages the user to agree to the selling price 266. If the pricing service 134 determines that the server computers 109 are not in demand (i.e, other instances 116 are not waiting to be implemented) and/or that purchasing back a portion of the duration 239 would result in idle server computers 109, the pricing service 134 may generate a price 266 that may not encourage the user to agree to the selling price 266. In one embodiment, the generated price 266 may not be a pro-rata refund for purchasing back the time that corresponds to the requested reduction. For example, the price 266 may provide an amount of profit, as can be appreciated.

If the modification is related to an extension in the duration 239, the pricing service determines the availability of the server computers 109, dynamically and/or based at least in part on historical data, for the period of time that corresponds to the extension in duration 239. If the pricing service 134 determines that other instances 116 are waiting to be implemented in the time that corresponds to the extension, the pricing service 134 may determine that the availability of the server computers 109 is low. Accordingly, the pricing service 134 determines a price 266 that may not encourage the user to accept. For example, extending the duration 239 of the instance 116 when the availability of the server computers is low may involve re-provisioning previously provisioned instances 116, migrating the user's instance 116 and/or other actions to accommodate the extension of the duration 239. Alternatively or additionally, if the pricing service 134 determines that other instances 116 are not scheduled to be implemented in the time that corresponds to the extension, the pricing service 134 may determine a price 266 that encourages the user to accept the price 266. In one embodiment, the price 266 for extending the duration 239 when the availability of the server computers 109 is low may be greater than when the availability of the server computers 109 is high.

If the modification is related to converting a finite life instance 116 to an indefinite duration 239 (i.e., convert the finite life instance 116 to an instance 116, i.e. an instance without a predetermined lifetime), the pricing service 134 determines a price 266 that is higher than if the user had originally requested an ordinary instance. Converting the finite life instance 116 to an ordinary instance 116 with an indefinite duration 239 may involve re-provisioning other instances 116, migrating the user's instance 116 and/or other actions to accommodate the indefinite duration 239. As such, a higher price 266 may discourage the user from accepting the price 266. In some embodiments, the price provided to the user may be a price for instances determined by and/or based at least in part on a spot market for instances. By accepting the price, the user may accept the spot market price and the instance may operate until one of several events occur, such as the user (or another user with authority) expressly turning off the instance, the spot market price exceeding a price the user has expressed willingness to pay (at which the instance may be automatically turned off so that the resources can be used for another user's instance who has agreed to the higher spot market price) and the like. In embodiments that utilize a spot market, the user may accept the price and/or specify a maximum price he/she is willing to pay. A user may, for example, accept the presented price but specify a higher price so that one or more instances will continue operation despite some (or all) spot market price fluctuations.

As illustrated, in step 513, the pricing service 134 provides the generated price 266 to the user and determines whether the user provides an indication to modify the finite life instances 116 at the determined price 266. For example, the pricing service 134 may provide the price 266 via a user interface rendered on the client device and/or may publish the price 266 that may otherwise by accessible to the user. If the user transmits an indication to modify the finite life instances 116 at the determined price 266, the pricing service 134 accepts and advances to step 516 and transmits a request to the instance service 123 (FIG. 2) to modify the finite life instances 116 as requested. Returning to step 513, if the user does not accept the price 266, then the pricing service 134 advances to step 519 and does not transmit a request to modify the finite life instances 116.

Figure 6:
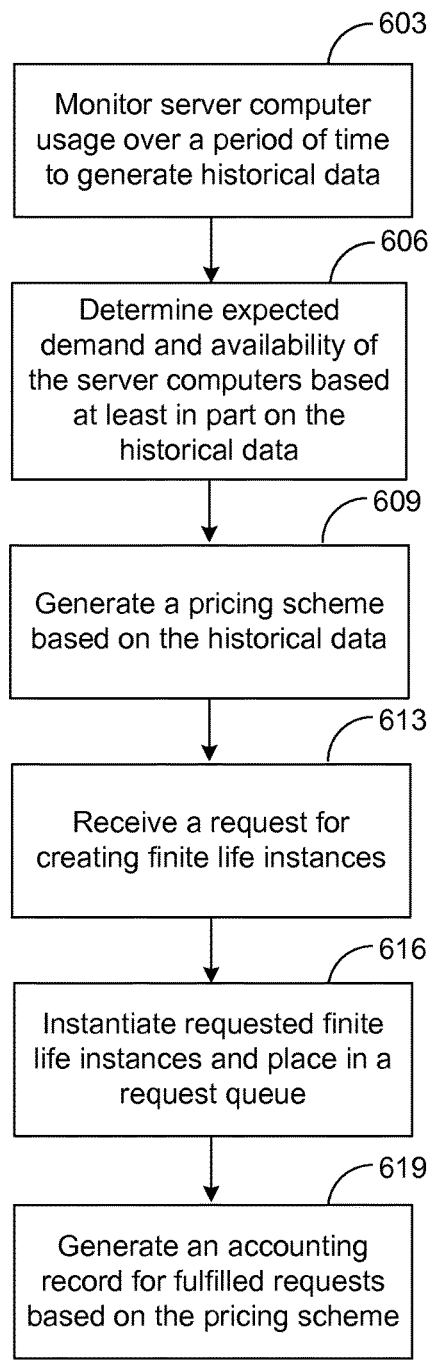
FIG. 6 is a flow chart illustrating an exemplary method for generating a price for implementing instances associated with a queue.

FIG. 6 is a flowchart that illustrates steps of a process for the pricing service 134 to generate and/or publish a price 266 for implementing finite life instances 116 (FIG. 1) as part of a queue, according to certain embodiments. In one embodiment, the distributed computing resource system 103 may implement finite life instances 116 that are associated with a queue. For example, the finite life instances 116 may be implemented on a first in, first out approach, a best fit approach, and/or any other approach. In particular, the placement service 126 (FIG. 1) provisions finite life instances 116 associated with the queue to a server computer 109 based at least in part on a first in, first out (FIFO) approach, based at least in part on the demand and availability of the server computer 109 and/or based at least in part on the duration 239 (FIG. 1) of the finite life instances 116. For instance, the queue may be processed in a manner such that requests in the queue for numbers of instances that are closest to but less than or equal to a number of instances implementable using detected capacity are given higher priority. Priority in the queue may also be determined such that expirations for requests are taken into account so as to implement instances for requests before the requests expire. In step 603, the pricing service 134 monitors a usage of the sever computers 109 over a period of time to generate historical data. For example, monitoring the usage may include recording amounts of resources associated with finite life instances 116 being implemented, durations 239 of finite life instances 116 being implemented, start times 243 (FIG. 2) of finite life instances being implemented, modifications to the finite life instances 116 while the instances 116 are being implemented, idle resources of the server computers 109, attributes of instances 116 waiting to be implemented by the server computers 109, and/or other data indicative of the usage of the server computers 109.

In step 606, the pricing service 134 determines an expected demand and availability of the server computers 109 based at least in part on the historical data. In one embodiment, the pricing service 134 may determine the availability of the sever computers 109 based at least in part on a difference between a total number of resources associated with the server computers 109 and a portion of the total number of resources that were historically implementing instances 116 for a given period of time. For example, the pricing service 134 may also determine the availability based at least in part on the duration 239 (FIG. 2) of the instances 116 historically being implemented by the server computers 109 and/or the start time 243 (FIG. 2) of the instances 116 historically being implemented by the server computers 109. Additionally, the pricing service 134 may determine the demand of the server computers 109 based at least in part on a number of instances 116 historically waiting to be implemented by the server computers 109. In another embodiment, the pricing service 134 may determine the expected demand and availability of the server computers 109 based at least in part on a current level of activity of the server computers 109 will be consistent.

In step 609, the pricing service 134 generates a pricing scheme based at least in part on the historical data. The historical data may include information related to the utilization of the server computers 109 up until the present time and/or the most recent time of measurement of the utilization of the server computers 109. In one embodiment, the pricing service 134 generates a pricing scheme that provides a price 266 (FIG. 1) based at least in part on the demand and availability of the server computers 109 as indicated by the historical data. Additionally, the pricing service 134 may also generate a pricing scheme that provides the price 266 based at least in part on the duration 239 and/or start time of the requested finite life instances 116. In one embodiment, the pricing scheme may generate a price 266 for implementing instances 116 as part of an instance queue, as described above. Additionally, the pricing scheme may indicate that different prices 266 may be generated for implementing finite life instances 116 over the same period of time. For example, the price 266 for implementing the instances 116 is based at least in part on the demand and availability of the server computers 109, as described above. The demand and availability of the server computers 109 may change based on when the demand and availability of the server computers 109 are determined. Thus, a first customer may purchase finite life instances 116 to be implemented during a specific time period for a first price 266 that may be different than a second customer that purchases at a second price 266 implementation of the same amount of finite life instances 116 for the same time period.

Then, in step 613, the pricing service 134 receives a request from a user on a client device 106 to create finite life instances 116. For the purpose of illustration, instances (in the plural) or used. However, the request may be for a single instance and the process may be modified accordingly. The request may be made in multiple ways. For example, the user many manipulate one or more user interfaces to transmit the request and/or make one or more API calls to transmit the request for the instances 116. Also, requests may be made programmatically, such as by a computer system of the user or the user's organization (or operating on behalf of the user and/or his/her organization). Additionally, the user may indicate the duration 239, start time 243, an amount of resources to be associated with the requested instances 116, and/or any software to be implemented on the instances 116. In one embodiment, the user may optionally indicate a "need by" date that represents a date by which implementation of the requested instances 116 should be completed.

In step 616, the pricing service 134 invokes the instance service 123 (FIG. 1) to instantiate the instances 116 as requested by the user. Additionally, the placement service 126 (FIG. 1) inserts the instantiated finite life instances 116 in an instance queue for implementation by the server computers 109. In one embodiment, the server computers 109 may implement the instances 116 of the instance queue in a first in first out basis. In another embodiment, the server computers 109 may implement the instances 116 of the instance queue based at least in part on a best fit approach. For example, instances 116 of the instance queue may be implemented based at least in part on the availability of the server computers 109 and the attributes of the respective instance 116 (i.e., the duration 239, the resources required to implement the instance 116, and/or other attributes). Then, in step 619, the pricing service 134 generates an accounting record, such an invoice 263 (FIG. 2), for fulfilling the user's requested. For example, the invoice 263 may be transmitted to the user for rendering on a display of the client device 106 (FIG. 1).

Figure 7:
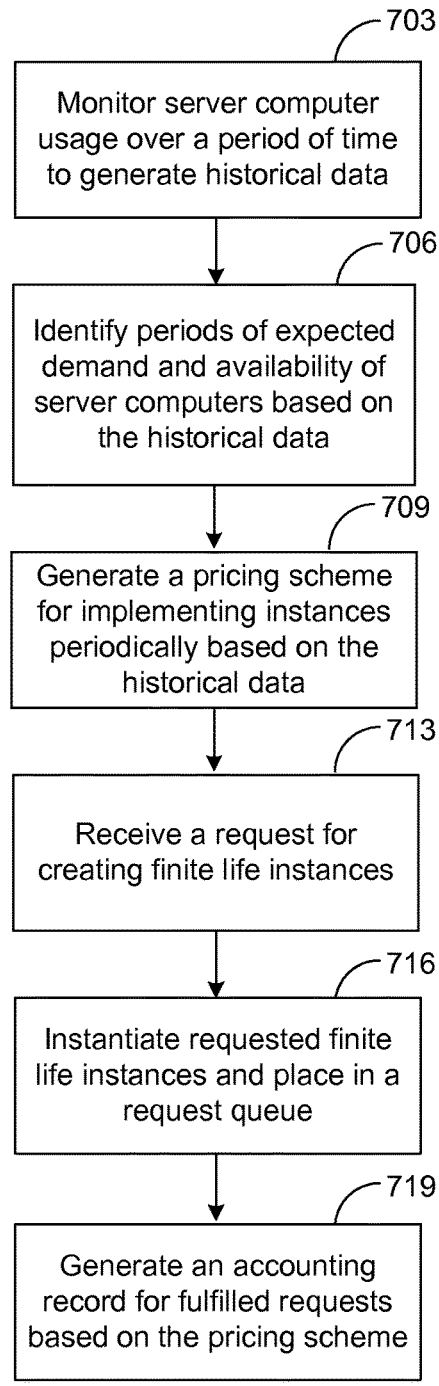
FIG. 7 is a flow chart illustrating an exemplary method for generating a price for implementing instances on a periodic basis.

FIG. 7 is a flowchart that illustrates steps of a process for the pricing service 134 to generate a price 266 if a user requests that the finite life instances 116 (FIG. 1) be implemented on a periodic basis, according to certain embodiments. It should be noted that a periodic basis is used for the purpose of illustration, but other bases may be used as well. For example, one or more instances may be requested on a predetermined schedule that is not necessarily periodic. In one embodiment, the finite life instances 116 may require that the requested instances 116 only be implemented on a periodic basis for an indicated duration 239 (FIG. 2). For example, the requested instances 116 may only need to be implemented during certain portions of the day and/or night.

In step 703, the pricing service 134 monitors a usage of the sever computers 109 over a period of time to generate historical data, such as described above. For example, monitoring the usage may include recording amounts of resources associated with finite life instances 116 being implemented, durations 239 of finite life instances 116 being implemented, start times 243 (FIG. 2) of finite life instances being implemented, modifications to the finite life instances 116 while the instances 116 are being implemented, idle resources of the server computers 109, attributes of instances 116 waiting to be implemented by the server computers 109, and/or other data indicative of the usage of the server computers 109.

In step 706, the pricing service 134 determines periods of expected demand and availability of the server computers 109 based at least in part on the historical data. In one embodiment, the pricing service 134 may determine the availability of the sever computers 109 based at least in part on a difference between a total number of resources associated with the server computers 109 and a portion of the total number of resources that were historically implementing instances 116 for a given period of time. For example, the pricing service 134 may also determine the availability based at least in part on the duration 239 (FIG. 2) of the instances 116 historically being implemented by the server computers 109 and/or the start time 243 (FIG. 2) of the instances 116 historically being implemented by the server computers 109. Additionally, the pricing service 134 may determine the demand of the server computers 109 based at least in part on a number of instances 116 historically waiting to be implemented by the server computers 109.

In step 709, the pricing service 134 generates a pricing scheme based at least in part on the historical data. In one embodiment, the pricing service 134 generates a pricing scheme that provides a price 266 (FIG. 1) based at least in part on the demand and availability of the server computers 109 as indicated by the historical data. Additionally, the pricing service 134 may also generate a pricing scheme that provides the price 266 based at least in part on the duration 239 and/or start time of the requested finite life instances 116. In one embodiment, the pricing scheme may generate a price 266 for implementing instances 116 periodically based at least in part on the historical data, as described above. In this example, the pricing scheme may indicate a price 266 for each period of implementation. For instance, the pricing scheme may indicate that the price 266 for implementing instances 116 during portions of the day may be higher than implementing instances 116 during portions of the night.

Then, in step 713, the pricing service 134 receives a request from a user on a client device 106 to create finite life instances 116. For example, the user many manipulate one or more user interfaces to transmit the request and/or make one or more API calls to transmit the request for the instances 116. Additionally, the user may indicate the duration 239, start time 243, an amount of resources to be associated with the requested instances 116, and/or any software to be implemented on the instances 116. In one embodiment, the user may optionally indicate that the requested instances 116 be implemented periodically and/or for portions of the indicated duration 239.

In step 716, the pricing service 134 invokes the instance service 123 (FIG. 1) to instantiate the instances 116 as requested by the user. Additionally, the placement service 126 (FIG. 1) provisions the requested instances 116 based at least in part on the indication that the instances 116 only need to be implemented periodically and/or of portions of the indicated duration 239. For example, the requested instances 116 may only need to be implemented during certain hours of the day and/or night. The placement service 126 may provision the instances 116 to server computers 109 that are expected to have availability to implement the instances 116 at the requested periods of implementation. Additionally, the placement service 126 may provision other instances 116 to the same server computers 109 during periods when the periodic instances 116 are not scheduled for implementation. Then, in step 719, the pricing service 134 generates an accounting record, such an invoice 263 (FIG. 2), for fulfilling the user's requested. For example, the invoice 263 may be transmitted to the user for rendering on a display of the client device 106 (FIG. 1).

Figure 8:
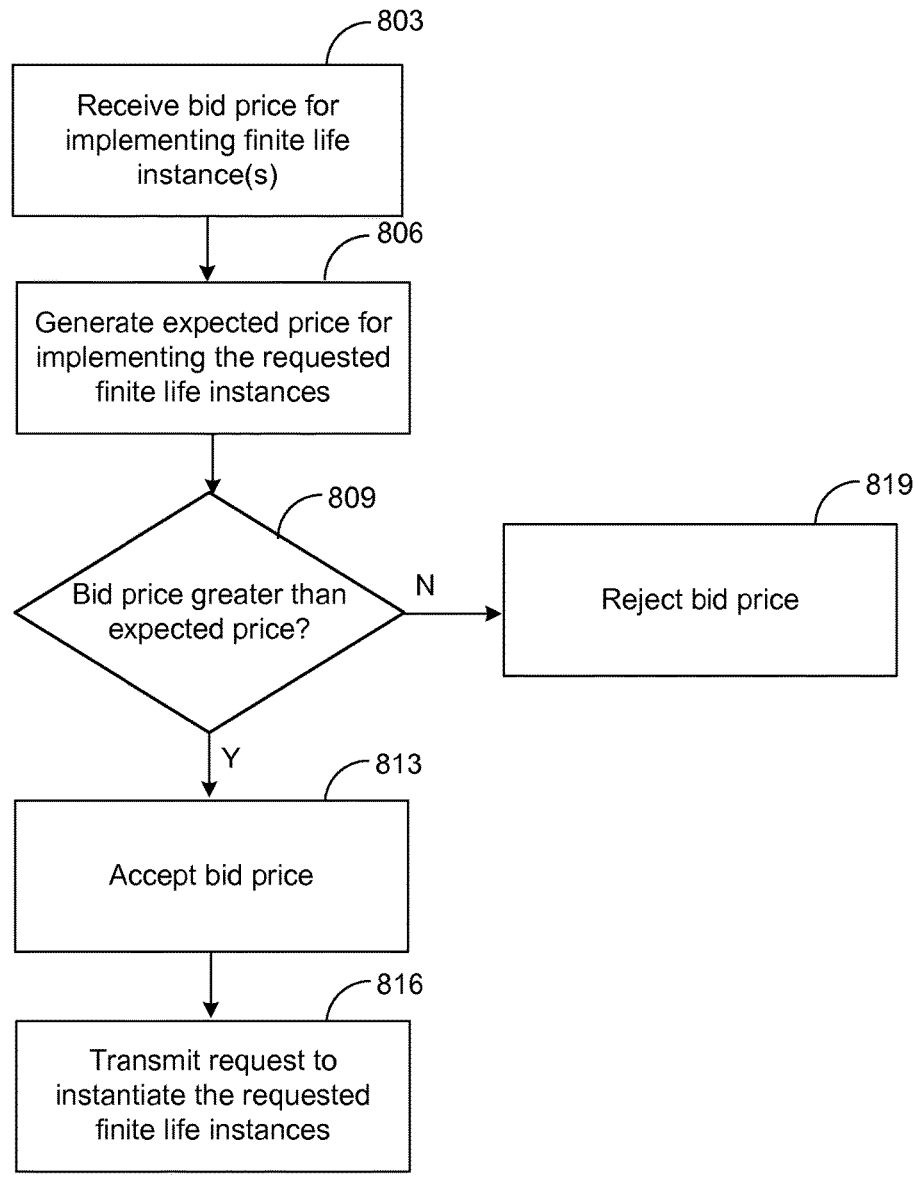
FIG. 8 is a flowchart illustrating an exemplary method for determining whether to accept a bid price for implementing finite life instances.

FIG. 8 is a flowchart that illustrates steps of a process for the pricing service 134 to accept a bid price offered by a user for implementing the finite life instances 116 (FIG. 1), according to certain embodiments. For example, a user may offer a bid price for implementing finite life instances 116 on the server computers 109 (FIG. 1). The pricing service 134 determines whether to accept the bid price based at least in part on the demand and availability of the server computers. In step 803, the pricing service 134 receives the request for implementing finite life instances 116 at an offered bid price. For example, the request may include the duration 239 (FIG. 2), the start time (243), and/or other parameters for the finite life instances 116. The request may also indicate that the finite life instances 116 be implemented on a periodic basis, as part of a queue, and/or another approach described herein. In another embodiment, the request may include a bid price for modifying one or more previously provisioned instances 116. Then, in step 806, the pricing service 134 may generate a base price 266 for the requested instances 116. For instance, the pricing service 134 may generate the base price 266 based at least in part on the availability and demand of the server computers 109, using one or more of the approaches described herein. Further the base price 266 may be generated for implementing the requested instances 116 according to the approach indicated in the request. Additionally and/or alternatively, the base price 266 may have been previously determined. For example, the pricing service 134 may have previously determined the base price 266 based at least in part on historical data. The base price may be based on historical data and a statistical calculation of one or more financial metrics (e.g. revenue). As an illustrative example, if the bid specifies a duration of eight hours, statistical calculations on historical data may indicate that other bids are likely to be received such that, over the eight hour time period, it is likely that revenue would be higher by rejecting the bid. For example, if the bid for eight hours is particularly low, it may be highly likely that a better overall price for the eight hours will be received. It may be probable that another user will submit a higher bid for the eight hours, or that multiple bids for smaller portions of the eight hour period will be received such that, when aggregated, more revenue would be achieved by selling the smaller portions. Two successive four-hour periods, for example, would provide more revenue if the respective bid prices for the four-hour periods, on average, were higher than a bid for the whole eight hours. Similarly, it would be advantageous to accept a bid for one hour that is higher than a bid for eight hours (when the bid is considered as being for the whole time period and not, as in some embodiments, a per-hour price).

Next, the pricing service 134 determines whether to accept the bid price offered by the user based at least in part on the base price 266. Accordingly, in n step 809, the pricing service 134 determines whether the bid price is greater than the base price 266. If the pricing service 134 determines that the bid price exceeds the base price 266, the pricing service advances to step 813 and accepts the bid price. For instance, the user may have offered a bid price higher than what the pricing service 134 would have quoted for implementing the requested instances 116. The pricing service 134 may accept the high bid price to realize a profit. Then, in step 816, the pricing service transmits a request to the instance service 123 instantiate the requested instances 116.

Returning to step 809, if the pricing service 134 determines that the bid price does not exceed the expected price 266, then the pricing service 134 advances to step 819 and rejects the bid price. In one embodiment, the pricing service 134 may generate (and provide, e.g. in an electronic message) a counter offer to the user to implement the requested instances 116. For example, the counter offer may be the base price 266, the expected cost for implementing the instances 116 as requested. In another embodiment, the pricing service 134 may determine whether to accept the bid price based on other factors. For instance, the pricing service 134 may determine to accept the bid price if the user submitting the bid price has a history of purchasing instances 116. In this example, the pricing service 134 may determine to accept the bid price even if the bid price is not greater than the expected price. As another example, the pricing service 134 may also determine to accept the bid price if the user submitting the bid price has never purchased instances 116. In this example, the pricing service 134 may determine to accept the bid price to encourage repeat purchases from the user.

Figure 9:
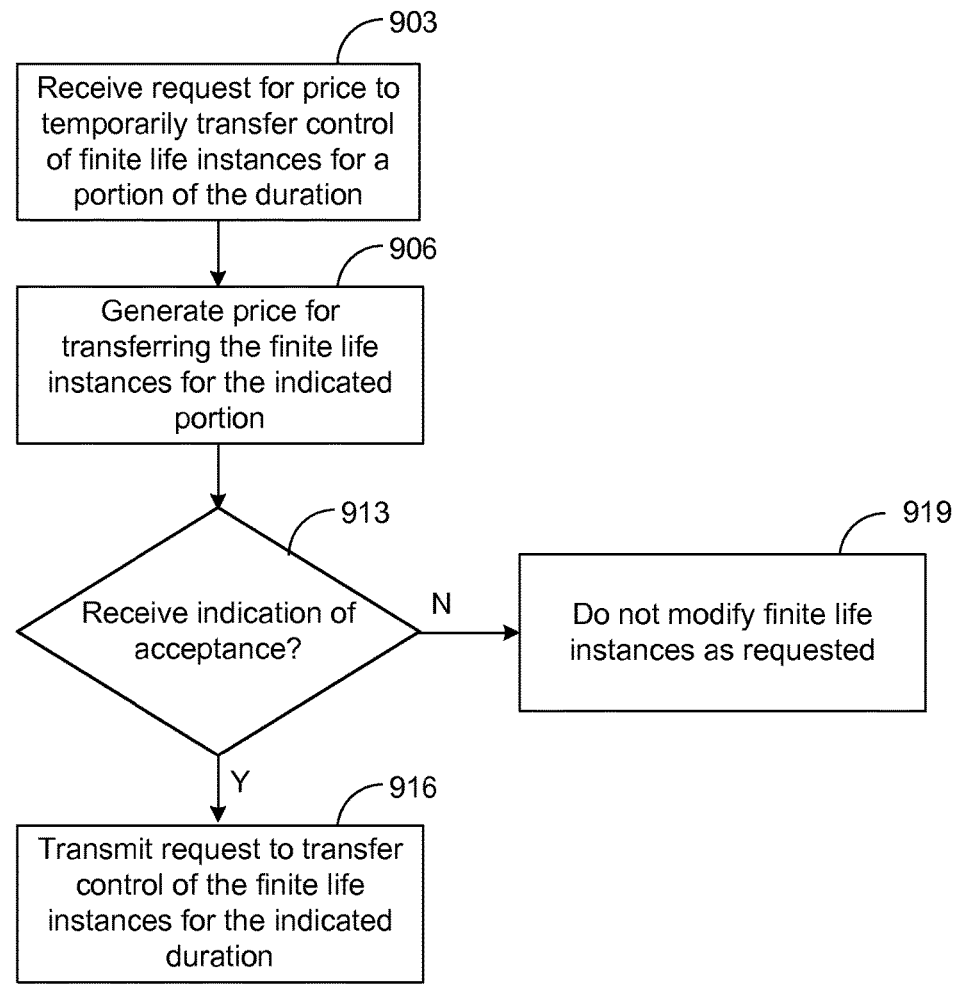
FIG. 9 is a flowchart illustrating an exemplary method for generating a price for leasing a finite life instance for a portion of the duration.

FIG. 9 is a flowchart that illustrates steps of a process for the pricing service 134 to generate a price 266 (FIG. 2) for temporarily transferring control of previously provisioned instances 116 (FIG. 1) for a portion of the duration 239, according to certain embodiments. For example, a user may wish to retain control of previously provisioned instances 116 but temporarily release control of the previously provisioned instances 116 for a period of time. Beginning with step 903, the pricing service 134 receives a request to provide a price 266 for temporarily providing control of previously provisioned finite life instances 116 for a portion of the duration 239 to another user. In step 906, the pricing service 134 generates and/or provides a published price 266 for transferring control of the finite life instances 116 for the indicated portion of the duration 239. In one embodiment, the pricing service 134 may determine, dynamically and/or based at least in part on historical data, the demand for server computers 109 during the period of time that corresponds to the indicated portion of the duration 239. For example, the pricing service 134 may determine whether other instances 116 are waiting and/or are historically waiting to be implemented that are associated with a duration 239 corresponding to the indicated period of time to transfer control. Additionally, the pricing service 134 may generate and/or provide a published price 266 based at least in part on the availability of the other server computers 109 during a time that corresponds to the indicated portion of the duration 239. The pricing service 134 may also generate the price 266 based at least in part on historical data of the demand of the server computers during the time that corresponds to the indicated portion of the duration 239.

Then, in step 913, the pricing service 134 provides the generated price 266 to the user and determines whether an indication of acceptance is received. If an acceptance is received, then the pricing service 134 advances to step 916 and transmits a request to the instance service 123 (FIG. 1) to transfer control of the finite life instance 116 for the indicated portion of the duration 239. For example, control of the finite life instance 116 may be transferred to another user who may provide a new machine image including new software and/or other applications to be implemented. The instance service 123 may then mark the finite life instance 116 for termination upon the expiration of the indicated period (i.e., the indicated portion of time). The instance service 123 may transfer the ownership back to the user upon termination of the period. Returning to step 913, if the acceptance is not received, then the pricing service 134 does not transmit a request to transfer ownership of the finite life instance 116 for the indicated duration 239.

Some or all of the process described in FIGS. 3-9 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 10:
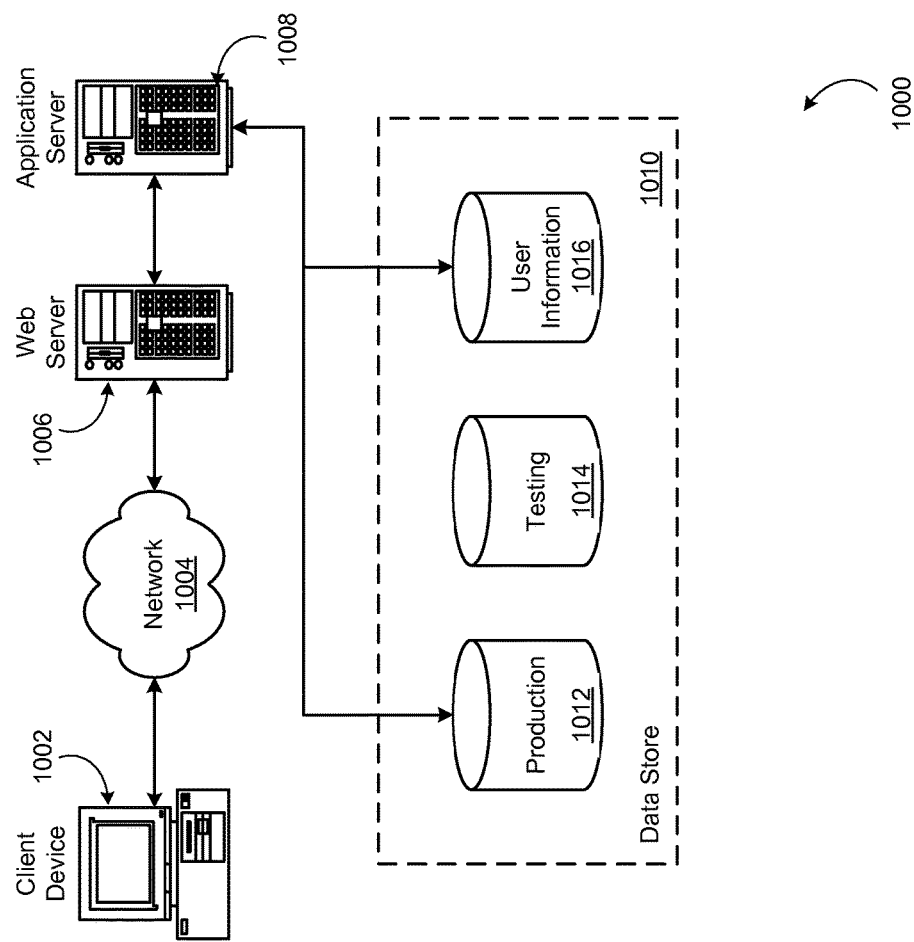
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network 1004 can include any appropriate network, including an intranet, the Internet, a cellular network, a local area network, or any other such network or combination thereof. Components used for such a system can depend at least in part upon the type of network and/or environment selected. Protocols and components for communicating via such a network 1004 are well known and will not be discussed herein in detail. Communication over the network 1004 can be enabled by wired or wireless connections, and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store 1010. As used herein the term "data store" refers to any device or combination of devices capable of storing, accessing, and retrieving data, which may include any combination and number of data servers, databases, data storage devices, and data storage media, in any standard, distributed, or clustered environment. The application server 1008 can include any appropriate hardware and software for integrating with the data store 1010 as needed to execute aspects of one or more applications for the client device 1002, handling a majority of the data access and business logic for an application. The application server 1008 provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1002 and the application server 1008, can be handled by the Web server 1006. It should be understood that the Web server 1006 and the application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store also is shown to include a mechanism for storing testing data 1014, which can be used for reporting, analysis, or other such purposes. It should be understood that there can be many other aspects that may need to be stored in the data store 1010, such as for page image information and to access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information to verify the identity of the user, and can access the catalog detail information to obtain information about items of that type. The information then can be returned to the user, such as in a results listing on a Web page that the user is able to view via a browser on the client device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a request to launch one or more computer system instances on a distributed computing resource system associated with a plurality of server computer systems;
   generating, based at least in part on the request, information indicating availability of the one or more computer system instances, the information generated by at least querying a database storing historical data corresponding to previous demand and availability of the plurality of server computer systems; and
   implementing, based at least in part on the information, the one or more computer system instances on the distributed computing resource system for a predetermined amount of time.

2. The computer-implemented method of claim 1, wherein the information indicating availability is further determined based at least in part on an expected demand of the plurality of server computer systems, the expected demand being based at least in part on historical data and current available capacity.

3. The computer-implemented method of claim 1, wherein a start time is identified to start implementation of the requested computer system instances.

4. The computer-implemented method of claim 3, wherein the information indicating availability is further determined based at least in part on the start time.

5. The computer-implemented method of claim 1, wherein the availability of the plurality of server computer systems is determined by at least:
   determining a total amount of resources associated with the plurality of server computer systems; and
   determining an amount of resources of the plurality of server computer systems uncommitted to implementing other computer system instances during a time that corresponds to the predetermined amount of time.

6. The computer-implemented method of claim 5, further comprising determining whether the uncommitted resources are uncommitted starting from a period that corresponds to an indicated start time.

7. A computer-implemented method, comprising:
   receiving, in connection with a request to create a computer system instance on a distributed computing resource system, information that indicates an expiration time for the computer system instance;
   generating, by a computer system of the one or more computer systems of the distributed computing resource system, information indicating availability of computer system instances based at least in part on the indicated expiration time and an expected availability information associated with one or more server computer systems of the distributed computing resource system to implement the requested computer system instance for a predetermined period of time; and
   causing one or more actions to implement the requested computer system instance on the distributed computing resource system according to the generated information.

8. The computer-implemented method of claim 7, further comprising enabling a user to indicate a start time to start implementation of the requested computer system instance.

9. The computer-implemented method of claim 8, wherein the information indicating availability is further determined based at least in part on the start time.

10. The computer-implemented method of claim 7, further comprising extending the expiration time based at least in part on an amount of time to be extended and an expected availability of the one or more server computer systems during the amount of time to be extended.

11. The computer-implemented method of claim 10, further comprising enabling a user to extend the expiration time.

12. The computer-implemented method of claim 7, further comprising removing the expiration time of the computer system instance such that the computer system instance is indefinite in lifetime.

13. The computer-implemented method of claim 7, further comprising completing implementation of the computer system instance by a specified date, the computer system instance being implemented at any time based at least in part on the expected availability of the one or more server computer systems.

14. The computer-implemented method of claim 7, wherein the expected availability of the one or more server computer systems is determined by at least:
   determining a total amount of resources associated with the one or more server computer systems; and
   determining an amount of resources of the one or more server computer systems uncommitted to implementing other computer system instances during a time that corresponds to the predetermined period of time.

15. The computer-implemented method of claim 14, further comprising determining whether the uncommitted resources are uncommitted starting from a period that corresponds to an indicated start time.

16. A non-transitory computer-readable storage media having collectively stored thereon instructions that, as a result of being executed by one or more processors of a computer system, cause the computer system to:
   generate, based at least in part on expected availability information associated with a utilization of a set of server computer systems of a distributed computing resource system in a future time period, information indicating a time period of one or more time periods having a length less than or equal to the length of the future time period, associates the time period with the information for implementing a computer system instance on the distributed computing resource system for a duration according to the time period.

17. The non-transitory computer-readable storage media of claim 16, having stored thereon instructions that, as a result of being executed by one or more processors of a computer system, further cause the computer system to enable a user to indicate a start time for the duration according to the time period to start implementation of the computer system instance.

18. The non-transitory computer-readable storage media of claim 16, having stored thereon instructions that, as a result of being executed by one or more processors of a computer system, further cause the computer system to enable a user to indicate an expiration time for the duration according to the time period to end implementation of the computer system instance.

19. The non-transitory computer-readable storage media of claim 16, wherein the expected availability information associated with a utilization of a set of server computer systems of a distributed computing resource system in a future time period is determined by at least:
   determine a total amount of resources associated with set of server computer systems; and
   determine an amount of resources of the set of server computer systems that are uncommitted for the duration according to the time period.

20. The non-transitory computer-readable storage media of claim 19, having stored thereon instructions that, as a result of being executed by one or more processors of a computer system, further cause the computer system to determine whether the uncommitted resources are uncommitted starting from a period that corresponds to an indicated start time.

21. The non-transitory computer-readable storage media of claim 16, wherein the availability of the set of server computer systems is based at least in part on a total number of resources associated with the set of server computer systems and a portion of the resources committed to previously provisioned computer system instances during a time that corresponds to the duration according to the time period.

22. The non-transitory computer-readable storage media of claim 16, wherein the implementation of the computer system instance is completed by a specified date, the computer system instance being implemented at any time based at least in part on the expected availability of the set of server computer systems.

23. A system, comprising:
   a processor; and
   a memory device including instructions that as a result of being executed by the processor, cause the processor to:
      receive a request for implementing one or more computer system instances on a distributed computing resource system for a specified duration;
      determine, based at least in part on the request, an expiration time for implementing one or more requested computer system instances on the distributed computing resource system based at least in part on an availability of a plurality of server computer systems on the distributed computing resource system; and
      perform one or more actions that cause the one or more computer system instances to be provisioned for a duration of time according to the request and the expiration time on the distributed computing resource system.

24. The system of claim 23, wherein the one or more computer system instances to be provisioned is completed by a specified date.

25. The system of claim 23, wherein the request is for implementing the computer system instances with a modified lifetime.

26. The system of claim 23, wherein the request is for implementing the computer system instances on a periodic basis for a lifetime.

27. The system of claim 23, wherein determining whether to accept the request comprises accepting the request if the request is within a predetermined threshold amount.

28. The system of claim 27, wherein the threshold amount is based at least in part on one of the availability of the set of server computer systems and historical data related to the availability of the set of server computer systems.

* * * * *